United States Patent
Li et al.

(10) Patent No.: US 11,006,475 B2
(45) Date of Patent: May 11, 2021

(54) DIRECT MODE OPERATION COMMUNICATION METHOD AND TERMINAL

(71) Applicant: HYTERA COMMUNICATIONS CORP., LTD., Guangdong (CN)

(72) Inventors: Huadong Li, Shenzhen (CN); Qingxiang Yu, Shenzhen (CN); Jun Hu, Shenzhen (CN)

(73) Assignee: HYTERA COMMUNICATIONS CORP., LTD., Guangdong (CN)

(*) Notice: Subject to any disclaimer, the term of this patent is extended or adjusted under 35 U.S.C. 154(b) by 407 days.

(21) Appl. No.: 15/761,527

(22) PCT Filed: May 24, 2016

(86) PCT No.: PCT/CN2016/083171
§ 371 (c)(1),
(2) Date: Jan. 15, 2019

(87) PCT Pub. No.: WO2017/049933
PCT Pub. Date: Mar. 30, 2017

(65) Prior Publication Data
US 2019/0132899 A1    May 2, 2019

(30) Foreign Application Priority Data

Sep. 21, 2015 (CN) .......................... 201510603832.7

(51) Int. Cl.
*H04W 76/23* (2018.01)
*H04W 76/14* (2018.01)
(Continued)

(52) U.S. Cl.
CPC .......... *H04W 76/23* (2018.02); *H04B 17/336* (2015.01); *H04W 76/14* (2018.02); *H04W 88/06* (2013.01)

(58) Field of Classification Search
CPC ..... H04W 76/23; H04W 76/14; H04W 88/06; H04B 17/336
See application file for complete search history.

(56) References Cited

U.S. PATENT DOCUMENTS 9,137,785 B2    9/2015  Almgren et al.
2002/0011955 A1*  1/2002  Apostolos .............. H01Q 21/24
                                                343/700 MS
(Continued)

FOREIGN PATENT DOCUMENTS

CN    104054282 A    9/2014
CN    104066126 A    9/2014
(Continued)

OTHER PUBLICATIONS

European Search Report from European Application No. 16847815.4 dated Jul. 3, 2018 (12 pages).
(Continued)

*Primary Examiner* — Jamal Javaid
(74) *Attorney, Agent, or Firm* — Calfee Halter & Griswold LLP (57) ABSTRACT

Embodiments of the present invention disclose is a direct mode operation communication method and terminal which are used for flexibly switching to a suitable DMO mode according to different communication environments, reasonably using spectrum resources, and extending multimedia services. The method in the embodiments of the present invention comprises: establishing, by a first terminal, a connection with a second terminal via a first DMO mode, the first DMO mode being a narrowband DMO mode, a wideband DMO mode, or a wideband-narrowband fused DMO dual-mode; receiving, by the first terminal, a wideband DMO signal sent by the second terminal; determining, by the first terminal, whether the quality of the wideband DMO signal satisfies a preset switching condition; and if the quality of the wideband DMO signal satisfies the preset switching condition, switching, by the first terminal, the first DMO mode to a second DMO mode to communicate with the second terminal. The embodiments of the present invention also provide a terminal, which is used for flexibly (Continued)

switching to a suitable DMO mode according to different communication environments, reasonably using spectrum resources, and extending multimedia services.

18 Claims, 3 Drawing Sheets

(51) Int. Cl.
*H04B 17/336* (2015.01)
*H04W 88/06* (2009.01)

(56) References Cited

U.S. PATENT DOCUMENTS

| | | | |
|---|---|---|---|
| 2004/0116086 A1 | 6/2004 | Huttunen | |
| 2016/0127273 A1* | 5/2016 | Jin | ........................ H04B 1/1036 455/423 |

FOREIGN PATENT DOCUMENTS

| | | | |
|---|---|---|---|
| CN | 104581614 A | 4/2015 | |
| CN | 104602200 A | 5/2015 | |
| CN | 105912157 A | 8/2016 | |
| CN | 106354339 A | 1/2017 | |
| CN | 106708328 A | 5/2017 | |
| EP | 1569384 A1 * | 8/2005 | ............ H04W 48/18 |
| EP | 1569384 A1 | 8/2005 | |
| GB | 2516132 A | 1/2015 | |

OTHER PUBLICATIONS

International Search Report and Written Opinion from PCT/CN2016/083171 dated Jul. 29, 2016 (11 pages).

First Office Action for Chinese Patent Application No. 201510603832.7 dated Mar. 5, 2019.

* cited by examiner

DIRECT MODE OPERATION COMMUNICATION METHOD AND TERMINAL

This application claims the priority to Chinese Patent Application No. 201510603832.7 filed by State Intellectual Property Office of the P.R. China on Sep. 21, 2015, and titled "Direct Mode Operation Communication Device Method and Terminal", the entire contents of which are incorporated herein by reference.

TECHNICAL FIELD

The present invention relates to the field of communications, and more particularly, to a direct mode operation communication method and terminal.

BACKGROUND

Wireless trunking communication systems are widely used to fields including scheduling generation, commanding and controlling, and the like. At present, wireless technology is developing towards greater channel capacity, higher spectrum utilization, and greater transmission bandwidth.

In trunking services, a direct mode operation (Direct Mode Operation, DMO) technology refers to a technology in which direct communication between terminals is performed without the coverage of a non-cellular network. The communication method does not require the support of a base station and can directly communicate between trunking terminals. It is mainly used in rural environments without network coverage and in urban environments with poor network coverage. It can be used as secondary coverage or backup coverage under incidents such as covert communications, network congestion, and overloads at parking lots, indoor areas, and underground sites.

Currently, DMO technology in narrowband trunking has been used commercially. The existing DMO technologies are almost all based on the narrowband. Because of the technical characteristics and high-frequency spectrum constraints of DMOs in wideband trunking, coverage distances are limited compared to the narrowband trunking technologies. DMO standards in wideband trunking are still under development.

SUMMARY

The embodiments of the present invention provide a direct mode operation communication method and terminal, which are used for flexibly switching to a suitable DMO mode according to different communication environments, reasonably using spectrum resources, and extending a multimedia service.

The embodiments of the present invention provide a direct mode operation DMO communication method, comprising:

establishing, by a first terminal, a connection with a second terminal via a first DMO mode, the first DMO mode being a narrowband DMO mode, a wideband DMO mode, or a wideband-narrowband fused DMO dual-mode;

Receiving, by the first terminal, a wideband DMO signal sent by the second terminal;

determining, by the first terminal, whether the quality of the wideband DMO signal satisfies a preset switching condition; and if the quality of the wideband DMO signal satisfies the preset switching condition, switching, by the first terminal, the first DMO mode to a second DMO mode to communicate with the second terminal, the second DMO mode being a narrowband DMO mode, a wideband DMO mode, or a wideband-narrowband fused DMO dual-mode, and the first DMO mode and the second DMO mode being different DMO modes.

Optionally, the first DMO mode is a wideband DMO mode, and the second DMO mode is a narrowband DMO mode.

Optionally, the determining, by the first terminal, whether the quality of the wideband DMO signal satisfies a preset switching condition comprises:

determining, by the first terminal, whether a reference signal receiving power RSRP corresponding to the wideband DMO signal is lower than a first preset threshold value; and if the RSRP is lower than the first preset threshold value, determining, by the first terminal, that the quality of the wideband DMO signal satisfies the preset switching condition.

Optionally, the determining, by the first terminal, whether the quality of the wideband DMO signal satisfies a preset switching condition comprises:

determining, by the first terminal, whether a signal to interference plus noise ratio SINR corresponding to the wideband DMO signal is lower than a second preset threshold value; and if the SINR is lower than the second preset threshold value, determining, by the first terminal, that the quality of the wideband DMO signal satisfies the preset switching condition.

Optionally, the first DMO mode is a narrowband DMO mode or a wideband DMO mode, and the second DMO mode is a wideband-narrowband fused DMO dual-mode.

Optionally, the determining, by the first terminal, whether the quality of the wideband DMO signal satisfies a preset switching condition comprises:

determining, by the first terminal, whether the RSRP corresponding to the wideband DMO signal is within a first preset range; and if the RSRP is within the first preset range, determining, by the first terminal, that the quality of the wideband DMO signal satisfies the preset switching condition;

or, determining, by the first terminal, whether the SINR corresponding to the wideband DMO signal is within a second preset range; and if the SINR is within the second preset range, determining, by the first terminal, that the quality of the wideband DMO signal satisfies the preset switching condition.

Optionally, the switching, by the first terminal, the first DMO mode to a second DMO mode to communicate with the second terminal comprises:

receiving, by the first terminal, the wideband DMO signal sent by the second terminal in a target transmission slot via the wideband mode in the wideband-narrowband fused DMO dual-mode, and simultaneously sending a narrowband DMO signal to the second terminal in the target slot via the narrowband mode in the wideband-narrowband fused DMO dual-mode.

Optionally, the narrowband DMO signal has feedback information, the feedback information is used for feeding back the receiving status of the wideband DMO signal sent by the second terminal received by the first terminal in a transmission slot before the target transmission slot, so that the second terminal adjusts the encoding mode of the wideband DMO signal transmitted in a transmission slot next to the target transmission slot.

Optionally, the first DMO mode is a narrowband DMO mode, and the second DMO mode is a wideband DMO mode.

Optionally, the determining, by the first terminal, whether the quality of the wideband DMO signal satisfies a preset switching condition comprises:

determining, by the first terminal, whether the RSRP corresponding to the wideband DMO signal is higher than a third preset threshold value; and if the RSRP is higher than the third preset threshold value, determining, by the first terminal, that the quality of the wideband DMO signal satisfies the preset switching condition;

or, determining, by the first terminal, whether the SINR corresponding to the wideband DMO signal is higher than a fourth preset threshold value; and if the SINR is higher than the fourth preset threshold value, determining, by the first terminal, that the quality of the wideband DMO signal satisfies the preset switching condition.

The embodiments of the present invention also provide a terminal, comprising:

an establishing module, configured to establish a connection with a second terminal via a first DMO mode, the first DMO mode being a narrowband DMO mode, a wideband DMO mode, or a wideband-narrowband fused DMO dual-mode;

a receiving module, configured to receive a wideband DMO signal sent by the second terminal;

a determination module, configured to determine whether the quality of the wideband DMO signal satisfies a preset switching condition; and a communication module, configured to switch the first DMO mode to a second DMO mode to communicate with the second terminal when the determination module determines that the quality of the wideband DMO signal satisfies the preset switching condition, the second DMO mode being a narrowband DMO mode, a wideband DMO mode, or a wideband-narrowband fused DMO dual-mode, and the first DMO mode and the second DMO mode being different DMO modes.

Optionally, the first DMO mode is a wideband DMO mode, and the second DMO mode is a narrowband DMO mode.

Optionally, the determination module is further configured to determine whether a reference signal receiving power RSRP corresponding to the wideband DMO signal is lower than a first preset threshold value; and the determination module is further configured to determine that the quality of the wideband DMO signal satisfies the preset switching condition when the RSRP is lower than the first preset threshold value.

Optionally, the determination module is further configured to determine whether a signal to interference plus noise ratio SINR corresponding to the wideband DMO signal is lower than a second preset threshold value; and the determination module is further configured to determine that the quality of the wideband DMO signal satisfies the preset switching condition when the SINR is lower than the second preset threshold value.

Optionally, the first DMO mode is a narrowband DMO mode or a wideband DMO mode, and the second DMO mode is a wideband-narrowband fused DMO dual-mode.

Optionally, the determination module is further configured to determine whether the RSRP corresponding to the wideband DMO signal is within a first preset range; and the determination module is further configured to determine that the quality of the wideband DMO signal satisfies the preset switching condition when the RSRP is within the first preset range;

or, the determination module is further configured to determine whether the SINR corresponding to the wideband DMO signal is within a second preset range; and the determination module is further configured to determine that the quality of the wideband DMO signal satisfies the preset switching condition when the SINR is within the second preset range.

Optionally, the communication module is further configured to receive the wideband DMO signal sent by the second terminal in a target transmission slot via the wideband mode in the wideband-narrowband fused DMO dual-mode, and simultaneously send a narrowband DMO signal to the second terminal in the target slot via the narrowband mode in the wideband-narrowband fused DMO dual-mode.

Optionally, the first DMO mode is a narrowband DMO mode, and the second DMO mode is a wideband DMO mode.

Optionally, the determination module is further configured to determine whether the RSRP corresponding to the wideband DMO signal is higher than a third preset threshold value; and the determination module is further configured to determine that the quality of the wideband DMO signal satisfies the preset switching condition when the RSRP is higher than the third preset threshold value;

or, the determination module is further configured to determine whether the SINR corresponding to the wideband DMO signal is higher than a fourth preset threshold value; and the determination module is further configured to determine that the quality of the wideband DMO signal satisfies the preset switching condition when the SINR is higher than the fourth preset threshold value.

The embodiments of the present invention also provide another terminal, comprising: a radio frequency module, a processor and a memory, wherein:

the radio frequency module executes the following step:

receiving a wideband DMO signal sent by a second terminal; and the processor executes the following steps:

establishing a connection with the second terminal via a first DMO mode, the first DMO mode being a narrowband DMO mode, a wideband DMO mode, or a wideband-narrowband fused DMO dual-mode; and determining whether the quality of the wideband DMO signal received by the radio frequency module satisfies a preset switching condition, and if the quality of the wideband DMO signal satisfies the preset switching condition, switching the first DMO mode to a second DMO mode to communicate with the second terminal, the second DMO mode being a narrowband DMO mode, a wideband DMO mode, or a wideband-narrowband fused DMO dual-mode, and the first DMO mode and the second DMO mode being different DMO modes.

Optionally, the first DMO mode is a wideband DMO mode, and the second DMO mode is a narrowband DMO mode.

Optionally, the processor specifically executes the following steps:

determining whether a reference signal receiving power RSRP corresponding to the wideband DMO signal is lower than a first preset threshold value; and determining that the quality of the wideband DMO signal satisfies the preset switching condition when the RSRP is lower than the first preset threshold value.

Optionally,

The processor specifically executes the following steps:

determining whether a signal to interference plus noise ratio SINR corresponding to the wideband DMO signal is lower than a second preset threshold value; and determining that the quality of the wideband DMO signal satisfies the preset switching condition when the SINR is lower than the second preset threshold value.

Optionally, the first DMO mode is a narrowband DMO mode or a wideband DMO mode, and the second DMO mode is a wideband-narrowband fused DMO dual-mode.

Optionally, the processor specifically executes the following steps:

determining whether the RSRP corresponding to the wideband DMO signal is within a first preset range; and determining that the quality of the wideband DMO signal satisfies the preset switching condition when the RSRP is within the first preset range;

or, determining whether the SINR corresponding to the wideband DMO signal is within a second preset range;

determining that the quality of the wideband DMO signal satisfies the preset switching condition when the SINR is within the second preset range.

Optionally, the radio frequency module specifically executes the following step:

receiving the wideband DMO signal sent by the second terminal in a target transmission slot via the wideband mode in the wideband-narrowband fused DMO dual-mode, and simultaneously sending a narrowband DMO signal to the second terminal in the target transmission slot via the narrowband mode in the wideband-narrowband fused DMO dual-mode.

Optionally, the first DMO mode is a narrowband DMO mode, and the second DMO mode is a wideband DMO mode.

Optionally, the processor specifically executes the following steps:

determining whether the RSRP corresponding to the wideband DMO signal is higher than a third preset threshold value; and determining that the quality of the wideband DMO signal satisfies the preset switching condition when the RSRP is higher than the third preset threshold value;

or, determining whether the SINR corresponding to the wideband DMO signal is higher than a fourth preset threshold value; and determining that the quality of the wideband DMO signal satisfies the preset switching condition when the SINR is higher than the fourth preset threshold value.

It can be seen from the above technical solutions that the embodiments of the present invention have the following advantages:

in the embodiment of the present invention, the first terminal establishes the connection with the second terminal via the first DMO mode, receives the wideband DMO signal sent by the second terminal, determines whether the wideband DMO signal satisfies the preset switching condition, and if the wideband DMO signal satisfies the preset switching condition, switches the first DMO mode to the second DMO mode to communicate with the second terminal. Because the narrowband DMO mode can increase a coverage area to a large extent, while the wideband DMO mode can support high-speed wideband multimedia services, the terminal in the solution can support multiple DMO modes and can switch among the multiple DMO modes, so that the terminal can flexibly switch to a suitable DMO mode according to different communication environments, reasonably uses spectrum resources, and extends multimedia services.

DETAILED DESCRIPTION

It should be understood that the technical solutions of the embodiments of the present invention can be applied to various communication systems, for example: a global system of mobile communication (Global System of Mobile Communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (LTE Frequency Division Duplex, FDD) system, an LTE time division duplex (LTE Time Division Duplex, TDD), a universal mobile telecommunication system (Universal Mobile Telecommunication System, UMTS), or a worldwide interoperability for microwave access (Worldwide Interoperability for Microwave Access, WIMAX) communication system, or the like.

It should be understood that, in the embodiments of the present invention, the first terminal or the second terminal comprises but is not limited to a user equipment (User Equipment, UE), a mobile station (Mobile Station, MS), a mobile terminal (Mobile Terminal), a mobile telephone (Mobile Telephone), a handset (Handset), and a portable equipment (Portable Equipment), etc. The user equipment may communicate with one or more core networks via a radio access network (Radio Access Network, RAN); for instance, the user equipment may be a mobile telephone (or called a "cellular" telephone), a computer with radio communication function, etc. The user equipment may also be portable, pocket-sized, hand-held, computer built-in, or vehicle-mounted mobile device.

The embodiments of the present invention provide a direct call communication method and terminal, which are used for rationally using spectrum resources and extending multimedia services.

Figure 1:
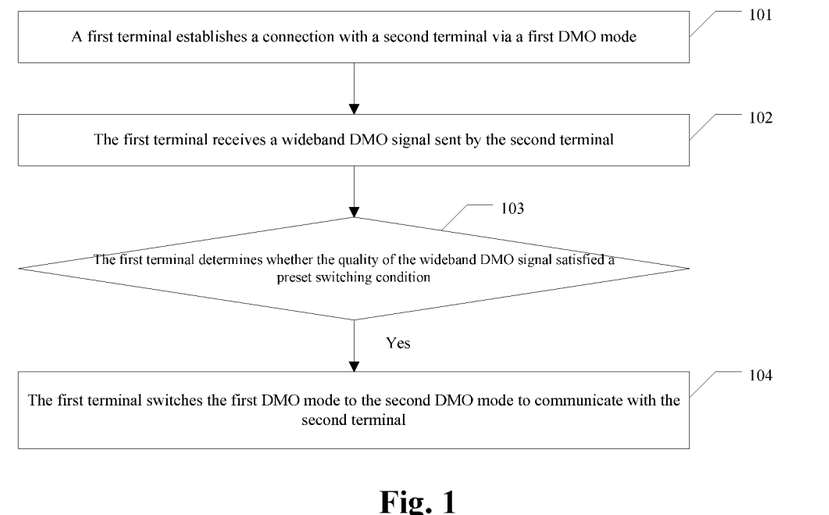
FIG. 1 is a schematic diagram of an embodiment of a direct mode operation communication method according to the embodiments of the present invention.

Referring to FIG. 1, an embodiment of a direct mode operation communication method according to the embodiments of the present invention comprises the following steps.

In step 101, a first terminal establishes a connection with a second terminal via a first DMO mode;

in the embodiment of the present invention, the first terminal establishes the connection with the second terminal via the first DMO mode, the first DMO mode being a narrowband DMO mode, a wideband DMO mode, or a wideband-narrowband fused DMO dual-mode.

In step 102, the first terminal receives a wideband DMO signal sent by the second terminal;

after the first terminal establishes the connection with the second terminal via the first DMO mode, the first terminal receives the wideband DMO signal sent by the second terminal; it should be noted that no matter the first terminal establishes the connection with the second terminal via the narrowband DMO mode, the wideband DMO mode or the wideband-narrowband fused DMO dual-mode, the first terminal can receive the wideband DMO signal sent by the second terminal as long as the first terminal enters the coverage area of the wideband DMO signal of the second terminal.

In step 103, the first terminal determines whether the quality of the wideband DMO signal satisfied a preset switching condition, and if the quality of the wideband DMO signal satisfied the preset switching condition, then step 104 is executed;

the first terminal, after receiving the wideband DMO signal sent by the second terminal, determines whether the quality of wideband DMO signal satisfies the preset condition, and if the quality of wideband DMO signal satisfies the preset condition, then step 104 is executed.

In step 104, the first terminal switches the first DMO mode to the second DMO mode to communicate with the second terminal.

When the first terminal determines that the quality of wideband DMO signal satisfies the preset condition, the first terminal switches the first DMO mode to the second DMO mode to communicate with the second terminal. It should be noted that the second DMO mode is a narrowband DMO mode, a wideband DMO mode, or a wideband-narrowband fused DMO dual-mode. It should also be noted that, in the embodiment of the present invention, the first DMO mode and the second DMO mode are different.

In the embodiment of the present invention, the first terminal establishes the connection with the second terminal via the first DMO mode, receives the wideband DMO signal sent by the second terminal, determines whether the wideband DMO signal satisfies the preset switching condition, and if the wideband DMO signal satisfies the preset switching condition, switches the first DMO mode to the second DMO mode to communicate with the second terminal. Because the narrowband DMO mode can increase a coverage area to a larger extent, while the wideband DMO mode can support high-speed wideband multimedia services, the terminal in the solution can support multiple DMO modes and can switch among the multiple DMO modes, so that the terminal can flexibly switch to a suitable DMO mode according to different communication environments, reasonably uses spectrum resources, and extends multimedia services.

The first DMO mode or the second DMO mode may be a narrowband DMO mode, a wideband DMO mode, or a wideband-narrowband fused DMO dual-mode; therefore, there may be various situations when switching the first DMO mode to the second DMO mode. The following describes several situations therein in details.

The first situation is to switch from the wideband DMO mode to the narrowband DMO mode.

Figure 2:
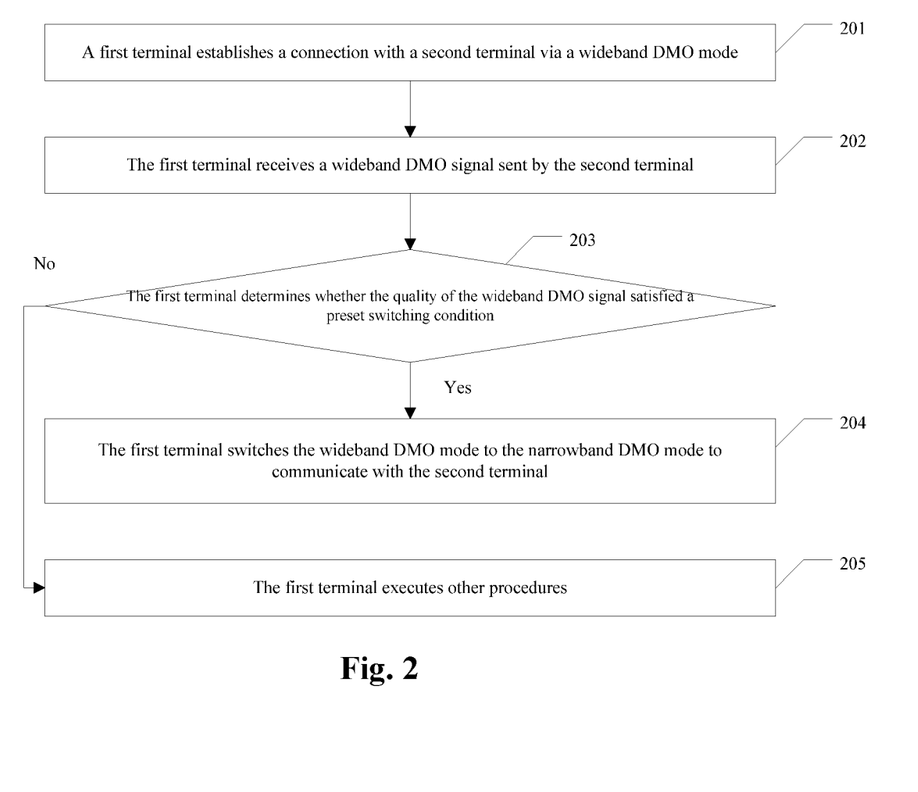
FIG. 2 is a schematic diagram of another embodiment of a direct mode operation communication method according to the embodiments of the present invention.

Referring to FIG. 2, another embodiment of a DMO communication method according to the embodiments of the present invention comprises the following steps.

In step 201, a first terminal establishes a connection with a second terminal via a wideband DMO mode.

In step 202, the first terminal receives a wideband DMO signal sent by the second terminal;

the first terminal, after establishing the connection with the second terminal, receives the wideband DMO signal sent by the second terminal.

In step 203, the first terminal determines whether the quality of the wideband DMO signal satisfied a preset switching condition, and if the quality of the wideband DMO signal satisfied the preset switching condition, then step 204 is executed; otherwise, step 205 is executed;

the first terminal, after receiving the wideband DMO signal, determines whether the quality of wideband DMO signal satisfies the preset switching condition, and if the quality of wideband DMO signal satisfies the preset switching condition, then step 204 is executed; otherwise, step 205 is executed.

To be specific, the first terminal may determine whether the quality of the wideband DMO signal satisfies the preset switching condition via several methods as follows.

1. The first terminal determines whether a reference signal receiving power (Reference Signal Receiving Power, RSRP) corresponding to the wideband DMO signal is lower than a first preset threshold value, and if the RSRP is lower than the first preset threshold value, determines that the quality of the wideband DMO signal satisfies the preset switching condition.

It should be noted that the reference signal receiving power corresponding to the wideband DMO signal may be the minimum receiving power of the wideband DMO signal at a certain transmission rate, and may be the average receiving power of the wideband DMO signal at a certain transmission rate, and may also be other receiving power corresponding to the wideband DMO signal, which will not be specifically limited herein.

2. The first terminal determines whether a signal to interference plus noise ratio (Signal to Interference plus Noise Ratio, SINR) corresponding to the wideband DMO signal is lower than a second preset threshold value, and if the RSRP is lower than the second preset threshold value, determines that the quality of the wideband DMO signal satisfies the preset switching condition.

3. The first terminal determines whether the RSRP corresponding to the wideband DMO signal is lower than a first preset threshold value, and if the RSRP is lower than the first preset threshold value, determines that the quality of the wideband DMO signal satisfies the preset switching condition.

It can be understood that, in addition to the RSRP and SINR, the first terminal may also determine whether the wideband DMO signal satisfies the preset switching condition by using parameters such as network coverage rate, received signal strength indicator (Received Signal Strength Indicator, RSSI), and reference signal received quality (Reference Signal Received Quality) that can characterize the signal quality, which will not be specifically limited herein.

In step 204, the first terminal switches the wideband DMO mode to the narrowband DMO mode to communicate with the second terminal;

when the first terminal determines that the quality of wideband DMO signal satisfies the preset switching condition, the first terminal switches the wideband DMO mode to the narrowband DMO mode to communicate with the second terminal.

In step 205, the first terminal executes other procedures.

When the first terminal determines that the quality of the wideband DMO signal does not satisfy the preset switching condition, the first terminal may continuously use the wideband DMO mode for communication, and may also determine whether the rate at which the first terminal and the second terminal transmit DMO service data is lower than a preset threshold value, and if the rate is lower than the preset threshold value, the first terminal switches the wideband DMO mode to the narrowband DMO mode, and may also execute other procedures, which will not be specifically limited herein.

In the embodiment of the present invention, the first terminal establishes the connection with the second terminal via the first DMO mode, receives the wideband DMO signal sent by the second terminal, determines whether the wideband DMO signal satisfies the preset switching condition, and if the wideband DMO signal satisfies the preset switching condition, switches the first DMO mode to the second DMO mode to communicate with the second terminal. Because the narrowband DMO mode can increase a coverage area to a larger extent, while the wideband DMO mode can support high-speed wideband multimedia services, the terminal in the solution can support multiple DMO modes and can switch among the multiple DMO modes, so that the terminal can flexibly switch to a suitable DMO mode according to different communication environments, reasonably uses spectrum resources, and extends multimedia services.

Secondly, the embodiment of the present invention provides a specific implementation manner in which the first terminal switches from the wideband DMO mode to the narrowband DMO mode and communicates with the second terminal, thereby improving the implementability of the solution.

Thirdly, the first terminal may determine whether the quality of the wideband DMO signal satisfies the preset switching condition via various methods, thereby improving the flexibility of the solution The second situation is to switch from the wideband DMO mode or narrowband DMO mode to the wideband-narrowband fused DMO dual-mode.

Figure 3:
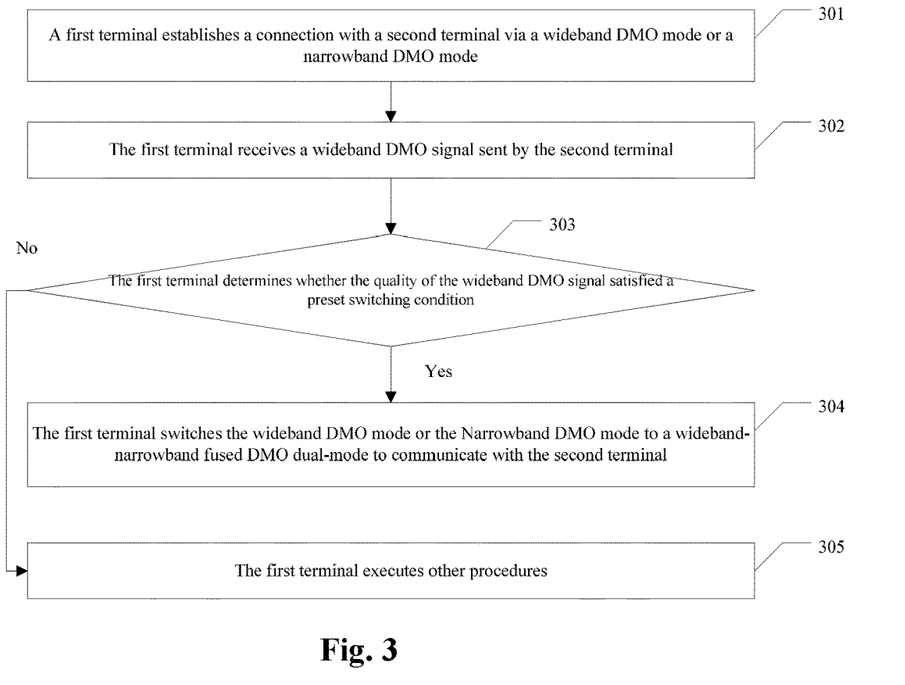
FIG. 3 is a schematic diagram of another embodiment of a direct mode operation communication method according to the embodiments of the present invention.

Referring to FIG. 3, another embodiment of a direct mode operation communication method according to the embodiments of the present invention comprises the following steps.

In step 301, a first terminal establishes a connection with a second terminal via a narrowband DMO mode or a wideband DMO mode.

In step 302, the first terminal receives a wideband DMO signal sent by the second terminal;

the first terminal, after establishing the connection with the second terminal, receives the wideband DMO signal sent by the second terminal. It should be noted that, no matter whether the first terminal establishes the connection with the second terminal via the narrowband DMO mode or the wideband DMO mode, the first terminal can receive the wideband DMO signal sent by the second terminal as long as the first terminal enters the coverage area of the wideband DMO signal of the second terminal.

In step 303, the first terminal determines whether the quality of the wideband DMO signal satisfies a preset switching condition, and if the quality of the wideband DMO signal satisfies the preset switching condition, then step 304 is executed; otherwise, step 305 is executed;

the first terminal, after receiving the wideband DMO signal, determines whether the quality of wideband DMO signal satisfies the preset switching condition, and if the quality of wideband DMO signal satisfies the preset switching condition, then step 304 is executed; otherwise, step 305 is executed.

To be specific, the first terminal may determine whether the quality of the wideband DMO signal satisfies the preset switching condition via several methods as follows.

1. The first terminal determines whether a reference signal receiving power (Reference Signal Receiving Power, RSRP) corresponding to the wideband DMO signal is within a first preset range, and if the RSRP is within the first preset range, determines that the quality of the wideband DMO signal satisfies the preset switching condition.

It should be noted that the reference signal receiving power corresponding to the wideband DMO signal may be the minimum receiving power of the wideband DMO signal at a certain transmission rate, and may be the average receiving power of the wideband DMO signal at a certain transmission rate, and may also be other receiving power corresponding to the wideband DMO signal, which will not be specifically limited herein.

2. The first terminal determines whether a signal to interference plus noise ratio (Signal to Interference plus Noise Ratio, SINR) corresponding to the wideband DMO signal is within a second preset range, and if the SINR is within the second preset range, determines that the quality of the wideband DMO signal satisfies the preset switching condition.

3. The first terminal determines whether the RSRP corresponding to the wideband DMO signal is within the first preset range, and if the RSRP is within the first preset range, determines whether the SINR corresponding to the wideband DMO signal is within the second preset range, and if the SINR is within the second preset range, then the first terminal determines that the quality of the wideband DMO signal satisfies the preset switching condition.

It can be understood that, in addition to the RSRP and the SINR, the first terminal may also determine whether the wideband DMO signal satisfies the preset switching condition by using parameters such as network coverage rate, received signal strength indicator (Received Signal Strength Indicator, RSSI), and reference signal received quality (Reference Signal Received Quality) that can characterize the signal quality, which will not be specifically limited herein.

In step 304, the first terminal switches the narrowband DMO mode or the wideband DMO mode to the wideband-narrowband fused DMO dual-mode to communicate with the second terminal;

when the first terminal determines that the quality of wideband DMO signal satisfies the preset switching condition, the first terminal switches the wideband DMO mode or the narrowband DMO mode to the wideband-narrowband fused DMO dual-mode to communicate with the second terminal.

To be specific, the first terminal may receive the wideband DMO signal sent by the second terminal in a target transmission slot via the wideband mode in the wideband-narrowband fused DMO dual-mode, and simultaneously send a narrowband DMO signal to the second terminal in the target slot via the narrowband mode in the wideband-narrowband fused DMO dual-mode. It should be noted that the narrowband DMO signal may include data or signaling, and may also include information, which will not be specifically limited herein. The signaling may include feedback information used for feeding back the receiving status of the wideband DMO signal sent by the second terminal received by the first terminal in a transmission slot before the target transmission slot, so that the second terminal adjusts the encoding mode of the wideband DMO signal transmitted in a transmission slot next to the target transmission slot. The signaling may also include other information, which will not be limited herein.

In step 305, the first terminal executes other procedures.

When the first terminal determines that the quality of the wideband DMO signal does not satisfy the preset switching condition, the first terminal may continuously use the original narrowband DMO mode or wideband DMO mode for communication, and may also execute other procedures, which will not be specifically limited herein.

In the embodiment of the present invention, the first terminal establishes the connection with the second terminal via the first DMO mode, receives the wideband DMO signal sent by the second terminal, determines whether the wideband DMO signal satisfies the preset switching condition, and if the wideband DMO signal satisfies the preset switching condition, switches the first DMO mode to the second DMO mode to communicate with the second terminal. Because the narrowband DMO mode can increase the coverage area to a larger extent, while the wideband DMO mode can support high-speed wideband multimedia services, the terminal in the solution can support multiple DMO modes and can switch among the multiple DMO modes, so that the terminal can flexibly switch to a suitable DMO mode according to different communication environments, reasonably uses spectrum resources, and extends multimedia services.

Secondly, the embodiment of the present invention provides a specific implementation manner in which the first terminal switches from the wideband DMO mode or narrowband DMO mode to the wideband-narrowband fused DMO dual-mode and communicates with the second terminal, thereby improving the implementability of the solution.

Thirdly, in the embodiment of the present invention, when the terminal communicates with the second terminal via the wideband-narrowband fused DMO dual-mode, the terminal can simultaneously receive and send signals, thereby improving the transmission efficiency.

Further, the first terminal may determine whether the quality of the wideband DMO signal satisfies the preset switching condition via various methods, thereby improving the flexibility of the solution.

The third situation is to switch from the narrowband DMO mode to the wideband DMO mode.

Figure 4:
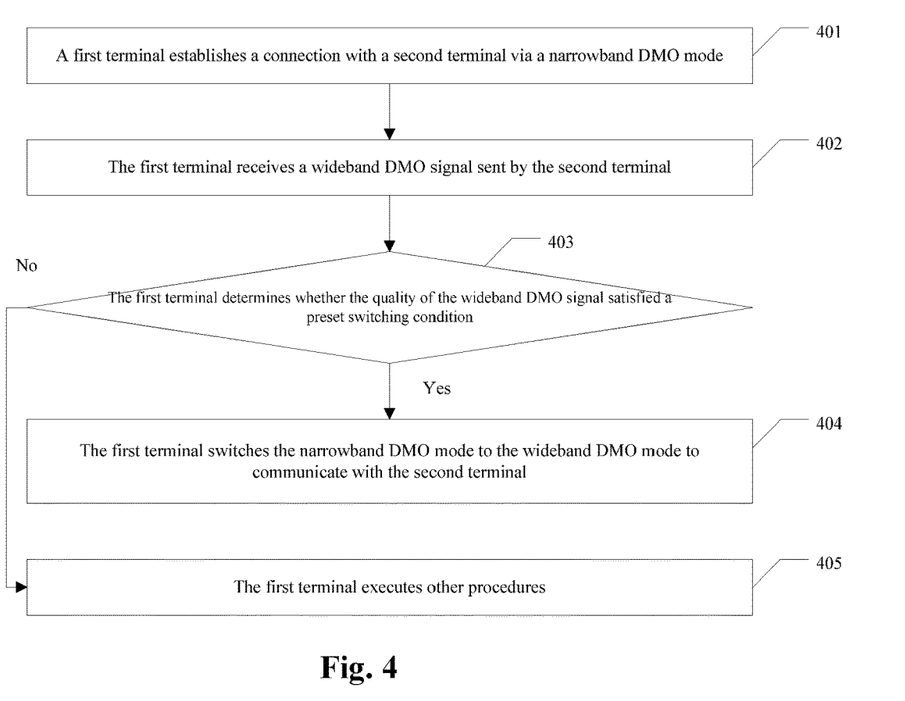
FIG. 4 is a schematic diagram of another embodiment of a direct mode operation communication method according to the embodiments of the present invention.

Referring to FIG. 4, another embodiment of a direct mode operation communication method according to the embodiments of the present invention comprises the following steps.

In step 401, a first terminal establishes a connection with a second terminal via a narrowband DMO mode.

In step 402, the first terminal receives a wideband DMO signal sent by the second terminal;

the first terminal, after establishing the connection with the second terminal, receives the wideband DMO signal sent by the second terminal. It should be noted that, even if the first terminal establishes the connection with the second terminal via the narrowband DMO mode, the second terminal can still send a wideband DMO signal; and the first terminal can receive the wideband DMO signal sent by the second terminal as long as the first terminal enters the coverage area of the wideband DMO signal.

In step 403, the first terminal determines whether the quality of the wideband DMO signal satisfies a preset switching condition, and if the quality of the wideband DMO signal satisfies the preset switching condition, then step 404 is executed; otherwise, step 405 is executed;

the first terminal, after receiving the wideband DMO signal, determines whether the quality of wideband DMO signal satisfies the preset switching condition, and if the quality of wideband DMO signal satisfies the preset switching condition, then step 404 is executed; otherwise, step 405 is executed.

To be specific, the first terminal may determine whether the quality of the wideband DMO signal satisfies the preset switching condition via several methods as follows.

1. The first terminal determines whether a reference signal receiving power (Reference Signal Receiving Power, RSRP) corresponding to the wideband DMO signal is higher than a third preset threshold value, and if the RSRP is higher than the third preset threshold value, determines that the quality of the wideband DMO signal satisfies the preset switching condition.

It should be noted that the reference signal receiving power corresponding to the wideband DMO signal may be the minimum receiving power of the wideband DMO signal at a certain transmission rate, and may be the average receiving power of the wideband DMO signal at a certain transmission rate, and may also be other receiving power corresponding to the wideband DMO signal, which will not be specifically limited herein.

2. The first terminal determines whether a signal to interference plus noise ratio (Signal to Interference plus Noise Ratio, SINR) corresponding to the wideband DMO signal is higher than a fourth preset threshold value, and if the SINR is higher than the fourth preset threshold value, determines that the quality of the wideband DMO signal satisfies the preset switching condition.

3. The first terminal determines whether the RSRP corresponding to the wideband DMO signal is higher than a third preset threshold value, and if the RSRP is higher than the third preset threshold value, then determines whether the SINR corresponding to the wideband DMO signal is higher than a fourth preset threshold value, and if the SINR is higher than the fourth preset threshold value, the first terminal determines that the quality of the wideband DMO signal satisfies the preset switching condition.

It can be understood that, in addition to the RSRP and SINR, the first terminal may also determine whether the wideband DMO signal satisfies the preset switching condition by using parameters such as network coverage rate, received signal strength indicator (Received Signal Strength Indicator, RSSI), and reference signal received quality (Reference Signal Received Quality) that can characterize the signal quality, which will not be specifically limited herein.

In step 404, the first terminal switches the narrowband DMO mode to the wideband DMO mode to communicate with the second terminal;

when the first terminal determines that the quality of wideband DMO signal satisfies the preset switching condition, the first terminal switches the narrowband DMO mode to the wideband DMO mode to communicate with the second terminal.

In step 405, the first terminal executes other procedures.

When the first terminal determines that the quality of the wideband DMO signal does not satisfy the preset switching condition, the first terminal may continuously use the original wideband DMO mode for communication, and may also execute other procedures, which will not be specifically limited herein.

In the embodiment of the present invention, the first terminal establishes the connection with the second terminal via the first DMO mode, receives the wideband DMO signal sent by the second terminal, determines whether the wideband DMO signal satisfies the preset switching condition, and if the wideband DMO signal satisfies the preset switching condition, switches the first DMO mode to the second DMO mode to communicate with the second terminal. Because the narrowband DMO mode can increase the coverage area to a larger extent, while the wideband DMO mode can support high-speed wideband multimedia services, the terminal in the solution can support multiple DMO modes and can switch among the multiple DMO modes, so that the terminal can flexibly switch to a suitable DMO mode according to different communication environments, reasonably uses spectrum resources, and extends multimedia services.

Secondly, the embodiment of the present invention provides a specific implementation manner in which the first terminal switches from the narrowband DMO mode to the wideband DMO mode and communicates with the second terminal, thereby improving the implementability of the solution.

Thirdly, the first terminal may determine whether the quality of the wideband DMO signal satisfies the preset switching condition via various methods, thereby improving the flexibility of the solution.

It can be understood that, in addition to the foregoing several situations, the communication mode between the first terminal and the second terminal may also be a mode of switching from a wideband-narrowband fused mode to a narrowband mode, or switching from a wideband-narrowband mode to a wideband mode. According to different settings, the first terminal may switch between two modes, and may also switch among three modes, which will not be specifically limited herein. It should also be noted that in the foregoing embodiments corresponding to FIG. 2 to FIG. 4, after the first terminal switches the DMO mode, the DMO mode may be further switched with the change of the communication distance or the communication environment between the two terminals.

The following describes the direct mode operation communication method in the embodiments of the present invention by using an actual application scenario:

Handsets A, B, and C are in a power-on state. The handset B and the handset C are preset in a wideband DMO mode. Therefore, both the handset B and the handset C establish a connection with the handset A via a wideband DMO mode, and the handset A simultaneously talks to the handset B and the handset C. The handset B and the handset C receive a voice signal (wideband DMO signal) of the handset A.

The distance between the handset B (first terminal) and the handset A (second terminal) is 50 m. The handset B receives a voice signal (wideband DMO signal) sent by the handset A and detects that an SINR corresponding to the wideband DMO signal sent by the handset A is 10 dB. The handset B determines whether the quality of the wideband DMO signal satisfies a preset switching condition, i.e., determines whether the SINR corresponding to the voice signal is lower than 0 dB (second preset threshold value), and the handset B determines that the SINR (10 dB) corresponding to the voice signal sent by the handset A is higher than 0 dB, and the handset B determines that the quality of the wideband DMO signal sent by the handset A does not satisfy the preset switching condition, and the handset B still communicates with the handset A via a wideband DMO mode.

The distance between the handset C (first terminal) and the handset A (second terminal) is 3 km. The handset C receives a voice signal (wideband DMO signal) sent by the handset A and detects that an SINR corresponding to the wideband DMO signal sent by the handset A is −5 dB. The handset C determines whether the quality of the wideband DMO signal satisfies a preset switching condition, i.e., determines whether the SINR corresponding to the video signal is lower than 0 dB (second preset threshold value), and the handset C determines that the SINR (−5 dB) corresponding to the voice signal sent by the handset A is lower than 0 dB, and the handset C determines that the quality of the wideband DMO signal sent by the handset A satisfies the preset switching condition, and the handset C switches the wideband DMO mode to the narrowband DMO mode to communicate with the handset A.

Figure 5:
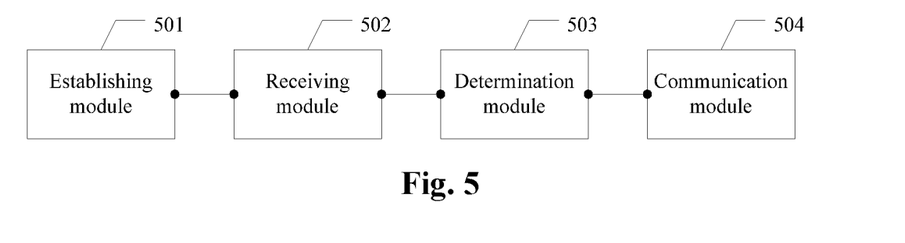
FIG. 5 is a schematic diagram of an embodiment of a terminal according to the embodiments of the present invention.

The above describes the direct mode operation communication method in the embodiments of the present invention. The following describes a terminal in the embodiments of the present invention. Referring to FIG. 5, an embodiment of the terminal in the embodiments of the present invention comprises:

an establishing module 501, configured to establish a connection with a second terminal via a first DMO mode, the first DMO mode being a narrowband DMO mode, a wideband DMO mode, or a wideband-narrowband fused DMO dual-mode;

a receiving module 502, configured to receive a wideband DMO signal sent by a second terminal;

a determination module 503, configured to determine whether the quality of the wideband DMO signal satisfies a preset switching condition; and a communication module 504, configured to switch the first DMO mode to a second DMO mode to communicate with the second terminal when the determination module 503 determines that the quality of the wideband DMO signal satisfies the preset switching condition, the second DMO mode being a narrowband DMO mode, a wideband DMO mode, or a wideband-narrowband fused DMO dual-mode, and the first DMO mode and the second DMO mode being different DMO modes.

In the embodiment of the present invention, the establishing module 501 establishes the connection with the second terminal via the first DMO mode, the receiving module 502 receives the wideband DMO signal sent by the second terminal, the determination module 503 determines whether the wideband DMO signal satisfies the preset switching condition, and if the wideband DMO signal satisfies the preset switching condition, the communication module 504 switches the first DMO mode to the second DMO mode to communicate with the second terminal. Because the narrowband DMO mode can increase a coverage area, while the wideband DMO mode can support high-speed wideband multimedia services to a larger extent, the terminal in the solution can support multiple DMO modes and can switch among the multiple DMO modes, i.e., the terminal can flexibly switch to a suitable DMO mode according to different communication environments, reasonably uses spectrum resources, and extends multimedia services.

Optionally, in some embodiments of the present invention, the first DMO mode is a wideband DMO mode, and the second DMO mode is a narrowband DMO mode.

The determination module 503 is further configured to determine whether the RSRP corresponding to the wideband DMO signal is lower than a first threshold value, and if the RSRP is lower than the first threshold value, determine that the quality of the wideband DMO signal satisfies the preset switching condition;

or, the determination module 503 is further configured to determine whether a signal to interference plus noise ratio SINR corresponding to the wideband DMO signal is lower than a second preset threshold value, and if the SINR is lower than the second preset threshold value, determine that the quality of the wideband DMO signal satisfies the preset switching condition.

The embodiment of the present invention provides a specific implementation manner in which the terminal switches from the wideband DMO mode to the narrowband DMO mode and communicates with another terminal, thereby improving the implementability of the solution.

Secondly, in the embodiment of the present invention, the determination module 503 may determine whether the quality of the wideband DMO signal satisfies the preset switching condition via various methods, thereby improving the flexibility of the solution Optionally, in some embodiments of the present invention, the first DMO mode is a narrowband DMO mode or a wideband DMO mode, and the second DMO mode is a wideband-narrowband fused DMO dual-mode.

The determination module 503 is further configured to determine whether the RSRP corresponding to the wideband DMO signal is within a first preset range, and if the RSRP is within the first preset range, determine that the quality of the wideband DMO signal satisfies the preset switching condition;

or, the determination module 503 is further configured to determine whether the SINR corresponding to the wideband DMO signal is within a second preset range, and if the RSRP is within the second preset range, determine that the quality of the wideband DMO signal satisfies the preset switching condition.

The embodiment of the present invention provides a specific implementation manner in which the terminal switches from the wideband DMO mode or the narrowband DMO mode to the wideband-narrowband fused DMO dual-mode and communicates with another terminal, thereby improving the implementability of the solution.

Secondly, in the embodiment of the present invention, the determination module 503 may determine whether the quality of the wideband DMO signal satisfies the preset switching condition via various methods, thereby improving the flexibility of the solution Optionally, in some embodiments of the present invention, the communication module 504 is further configured to receive the wideband DMO signal sent by the second terminal in the target transmission slot via the wideband mode in the wideband-narrowband fused DMO dual-mode, and simultaneously send the narrowband DMO signal to the second terminal in the target slot via the narrowband mode in the wideband-narrowband fused DMO dual-mode.

In the embodiment of the present invention, when the terminal communicates with another terminal via the wideband-narrowband fused DMO dual-mode, the communication module 504 can simultaneously receive and send signals, thereby improving the transmission efficiency.

Optionally, in some embodiments of the present invention, the first DMO mode is a narrowband DMO mode, and the second DMO mode is a wideband DMO mode.

The determination module 503 is further configured to determine whether the RSRP corresponding to the wideband DMO signal is higher than a third preset threshold value, and if the RSRP is higher than the third preset threshold value, determine that the quality of the wideband DMO signal satisfies the preset switching condition;

or, the determination module 503 is further configured to determine whether the SINR corresponding to the wideband DMO signal is higher than a fourth preset threshold value, and if the SINR is higher than the fourth preset threshold value, determine that the quality of the wideband DMO signal satisfies the preset switching condition.

Secondly, the embodiment of the present invention provides a specific implementation manner in which the terminal switches from the narrowband DMO mode to the wideband DMO mode and communicates with another terminal, thereby improving the implementability of the solution.

Thirdly, the determination module 503 may determine whether the quality of the wideband DMO signal satisfies the preset switching condition via various methods, thereby improving the flexibility of the solution.

Figure 6:
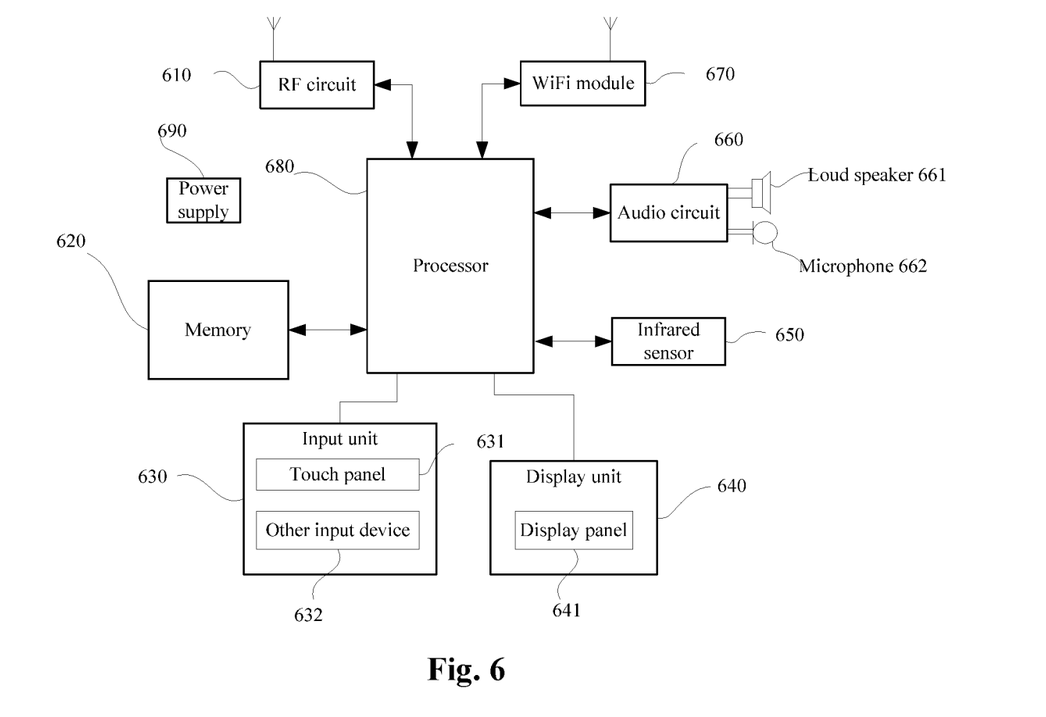
FIG. 6 is a schematic diagram of another embodiment of a terminal according to the embodiments of the present invention.

The above describes the terminal of the embodiment of the present invention from the perspective of functional modularity, and the following describes the terminal of the embodiment of the present invention hereinafter from the perspective of hardware entity. Referring to FIG. 6, which illustrates another embodiment of a terminal according to the embodiments of the present invention. For ease of illustration, only the parts related to the embodiments of the present invention are shown. For the specific technical details which are not disclosed, please refer to the method parts of the embodiments of the present invention. The terminal may be any terminal device including a handset, a tablet, a PDA (Personal Digital Assistant, personal digital assistant), a POS (Point of Sales, sales terminal), an on-board computer, and the like. Take the terminal which is a handset as an example.

FIG. 6 illustrates a block diagram of a partial structure of a handset related to the terminal provided by the embodiments of the present invention. Referring to FIG. 6, the handset includes: a radio frequency (Radio Frequency, RF) circuit 610, a memory 620, an input unit 630, a display unit 640, a sensor 650, an audio circuit 660, a wireless fidelity (Wireless Fidelity, WiFi) module 670, a processor 680, a power supply 690, and other components. Those skilled in the art can understand that the handset structure shown in FIG. 6 does not constitute a limitation to the handset, and may include more or less than the illustrated components, or combine some components, or have different component arrangements.

The following describes the various components of the handset in details with reference to FIG. 6.

The RF circuit 610 may be configured to receive and send signals during message sending and receiving or during a call, and specially receive and send the downlink information of a base station to the processor 680 to process; in addition, the RF circuit 610 sends designed uplink data to the base station. In general, the RF circuit 610 comprises but is not limited to an antenna, at least one amplifier, a transceiver, a coupler, a low noise amplifier (Low Noise Amplifier, LNA), a duplexer, and the like. Moreover, the RF circuit 610 may also communicate with a network and other devices via wireless communications. The wireless communications above may use any communication standard or protocol, comprising but not limited to global system of mobile communication (Global System of Mobile Communication, GSM), general packet radio service (General Packet Radio Service, GPRS), code division multiple access (Code Division Multiple Access, CDMA), wideband code division multiple access (Wideband Code Division Multiple Access, WCDMA), long-term evolution (Long Term Evolution, LTE), e-mail, short message service (Short Message Service, SMS), and the like.

The memory 620 may be configured to store software programs and modules. The processor 680 runs the software programs and modules stored in the memory 620 to perform various functional applications and data processing of the handset. The memory 620 may mainly include a program storage region and a data storage region. The program storage region may store an operating system, at least one application required by a function (such as a sound playing function, an image playing function, etc.) and the like; the data storage region may store data created according to the use of the handset (such as audio data, telephone book, etc.) and the like. In addition, the memory 620 may include a high-speed random access memory, and may also include a non-volatile memory, such as at least one disk memory device, a flash memory device, or other volatile solid storage devices.

The input unit 630 may be configured to receive input numeric or character information, as well as generate key signal inputs related to user settings and function control of the handset. Specifically, the input unit 630 may include a touch panel 631 and other input devices 632. The touch panel 631, also referred to as a touch screen, may collect touch operations on or near the user (such as the operation of the user by using any suitable object or accessory such as a finger or a stylus on the touch panel 631 or near the touch panel 631) and drive a corresponding connecting apparatus according to a preset program. Optionally, the touch panel 631 may comprise two parts of a touch detection apparatus and a touch controller. The touch detection apparatus detects the touch orientation of the user and detects a signal brought by the touch operation, and sends the signal to the touch controller. The touch controller receives touch information from the touch detection apparatus, converts the touch information into contact coordinates, and then sends the contact coordinates to the processor 680, and can receive a command sent by the processor 680 and execute the command. In addition, the touch panel 631 may be implemented in various types such as a resistive type, a capacitive type, infrared rays, and surface acoustic waves. Except the touch panel 631, the input unit 630 may also comprise other input devices 632. To be specific, other input devices 632 may comprise, but are not limited to, one or more of a physical keyboard, function keys (such as volume control keys, switching keys, etc.), trackballs, mice, joysticks, and the like.

The display unit 640 may be configured to display information input by the user or information provided to the user and various menus of the handset. The display unit 640 may comprise a display panel 641. Optionally, the display panel 641 may be configured in the form of a liquid crystal display (Liquid Crystal Display, LCD), an organic light-emitting diode (Organic Light-Emitting Diode, OLED), or the like. Further, the touch panel 631 may cover the display panel 641; when the touch panel 631 detects a touch operation thereon or nearby, the touch panel 631 transmits the touch operation to the processor 680 to determine the type of a touch event, then the processor 680 provides corresponding visual output on the display panel 641 according to the type of the touch event. Although in FIG. 6, the touch panel 631 and the display panel 641 are implemented as two separated components to implement the input and output functions of the handset, in some embodiments, the touch panel 631 and the display panel 641 may be integrated to achieve the input and output functions of the handset.

The handset may also include at least one sensor 650 such as a light sensor, a motion sensor, and other sensors. Specifically, the light sensor may comprise an ambient light sensor and a proximity sensor. The ambient light sensor may adjust the brightness of the display panel 641 according to the brightness of the ambient light. The proximity sensor may turn off the display panel 641 when the handset is moved close to an ear. As a motion sensor, an accelerometer sensor may detect the magnitude of acceleration in all directions (usually three axes), and may detect the magnitude and direction of gravity when stationary, and may be configured to identify the application of handset gestures (such as horizontal and vertical screen switching, related games, and magnetometer attitude calibration), vibration recognition related functions (such as pedometer, and tap), etc. As for other sensors such as gyroscopes, barometers, hygrometers, thermometers, and infrared sensors, which can be configured in the handset, they will not be elaborated herein.

An audio interface between the user and the handset may be provided by an audio circuit 660, a loud speaker 661 and a microphone 662. The audio circuit 660 may transmit the received electrical signal converted from the audio data to the loud speaker 661 and the electrical signal is converted to an audio signal and outputted by the loud speaker 661. On the other hand, the microphone 662 converts the collected sound signal into an electric signal, which is converted into audio data after being received by the audio circuit 660. After the audio data is outputted to the processor 680 for processing, the audio data is sent to another handset via the RF circuit 610, or the audio data is outputted to the memory 620 for further processing.

WiFi is a short-range wireless transmission technology. The handset can help the user to send and receive e-mails, browse web pages, and access streaming media via a WiFi module 670 which provides wireless wideband Internet access for the user. Although FIG. 6 shows the WiFi module 670, it can be understood that the WiFi module 670 does not belong to the necessary configuration of the handset and can be omitted as necessary without changing the essence of the invention.

The processor 680 is the control center of the handset, and uses various interfaces and lines to connect various parts of the handset, runs or executes software programs and/or modules stored in the memory 620, and calls data stored in the memory 620 to execute various functions of the handset and process data, thus entirely monitoring the handset. Optionally, the processor 680 may include one or more processing units. Preferably, the processor 680 may integrate an application processor and a modem processor, wherein the application processor mainly processes an operating system, a user interface, an application program, and the like, while the modem processor mainly processes wireless communications. It is to be understood that the above modem processor may also be not integrated into the processor 680.

The handset further includes a power supply 690 (such as a battery) to supply power to each component; preferably, the power supply may be logically connected to the processor 680 via a power management system, thus implementing functions like charging, discharging and power consumption management via the power management system.

The handset may also comprise a camera, a bluetooth module, or the like, which are not shown, and will not be elaborated herein.

In the embodiment of the present invention, the RF circuit 610 comprised in the terminal executes the following steps:
receiving a wideband DMO signal sent by a second terminal; and
the processor 680 executes the following steps:
establishing a connection with the second terminal via a first DMO mode, the first DMO mode being a narrowband DMO mode, a wideband DMO mode, or a wideband-narrowband fused DMO dual-mode; and
determining whether the quality of the wideband DMO signal received by the RF circuit 610 satisfies a preset switching condition, and if the quality of the wideband DMO signal satisfies the preset switching condition, switching the first DMO mode to a second DMO mode to communicate with the second terminal, the second DMO mode being a narrowband DMO mode, a wideband DMO mode, or a wideband-narrowband fused DMO dual-mode.

Optionally, in some other embodiments of the present invention, the first DMO mode is a wideband DMO mode, and the second DMO mode is a narrowband DMO mode.

Optionally, in some other embodiments of the present invention, the processor 680 specifically executes the following steps:
determining whether the RSRP corresponding to the wideband DMO signal is lower than a first preset threshold value; and
determining that the quality of the wideband DMO signal satisfies the preset switching condition when the RSRP is lower than the first preset threshold value.

Optionally, in some other embodiments of the present invention, the processor 680 specifically executes the following steps:
determining whether an SINR corresponding to the wideband DMO signal is lower than a second preset threshold value; and
determining that the quality of the wideband DMO signal satisfies the preset switching condition when the SINR is lower than the second preset threshold value.

Optionally, in some other embodiments of the present invention, the first DMO mode is a narrowband DMO mode or a wideband DMO mode, and the second DMO mode is a wideband-narrowband fused DMO dual-mode.

Optionally, in some other embodiments of the present invention, the processor 680 specifically executes the following steps:
determining whether the RSRP corresponding to the wideband DMO signal is within a first preset range; and
determining that the quality of the wideband DMO signal satisfies the preset switching condition when the RSRP is within the first preset range.

Optionally, in some other embodiments of the present invention, the processor 680 specifically executes the following steps:
determining whether the SINR corresponding to the wideband DMO signal is within a second preset range;
determining that the quality of the wideband DMO signal satisfies the preset switching condition when the SINR is within the second preset range.

Optionally, in some other embodiments of the present invention, the radio frequency module specifically executes the following steps:
receiving the wideband DMO signal sent by the second terminal in a target transmission slot via the wideband mode in the wideband-narrowband fused DMO dual-mode, and simultaneously sending a narrowband DMO signal to the second terminal in the target transmission slot via the narrowband mode in the wideband-narrowband fused DMO dual-mode.

Optionally, in some other embodiments of the present invention, the first DMO mode is a narrowband DMO mode, and the second DMO mode is a wideband DMO mode.

Optionally, in some other embodiments of the present invention, the processor 680 specifically executes the following steps:
determining whether the RSRP corresponding to the wideband DMO signal is higher than a third preset threshold value; and
determining that the quality of the wideband DMO signal satisfies the preset switching condition when the RSRP is higher than the third preset threshold value.

Optionally, in some other embodiments of the present invention, the processor 680 specifically executes the following steps:
determining whether the SINR corresponding to the wideband DMO signal is higher than a fourth preset threshold value; and
determining that the quality of the wideband DMO signal satisfies the preset switching condition when the SINR is higher than the fourth preset threshold value.

Those skilled in the art can clearly understand that, for convenience and brevity of description, the specific working processes of the above-described systems, apparatuses, and units may refer to the corresponding processes in the foregoing method embodiments, and will not be elaborated herein.

In the several embodiments provided in the present application, it should be understood that the disclosed systems, apparatuses and methods may be implemented in other ways. For example, the device embodiments described above are merely illustrative. For example, the division of the units is only one logical function division. In practice, there may be another division manner. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separation parts may or may not be physically separated, and the parts displayed as units may or may not be physical units, that is, may be located in one place, or may be distributed on multiple network units.

Some or all of the units may be selected according to actual needs to achieve the objectives of the solutions in the embodiments.

In addition, each functional unit in each embodiment of the present invention may be integrated in one processing unit, or each unit may exist alone physically, or two or more units may be integrated in one unit. The integrated units above may be implemented in the form of hardware, or in the form of software functional units.

The integrated units may also be stored in a computer-readable storage medium if being implemented in the form of a software functional module and sold or used as an independent product. Based on such understanding, the essence of the technical solutions of the present invention, or the part contributing to the prior art or all or a part of the technical solutions, may be embodied in the form of a software product which is stored in a storage medium including a number of instructions such that a computer device (which may be a personal computer, a server, or a network device, etc.) performs all or a part of steps of the method described in each of the embodiments of the present invention. The foregoing storage medium includes: any medium that is capable of storing program codes such as a USB disk, a mobile hard disk, a read only memory (ROM, Read-Only Memory), a random access memory (RAM, Random Access Memory), a magnetic disk or an optical disk, and the like.

As mentioned above, the above embodiments are only used to illustrate the technical solution of the invention, rather than limiting the invention; although the invention has been described in detail with reference to the foregoing embodiments, those with ordinary skills in the art should understand that: the technical solutions described in the foregoing embodiments can be still modified or some of the technical features can be equivalently replaced; however, these modifications or substitutions shall not depart from the spirit and scope of the technical solutions of the embodiments of the invention.

The invention claimed is:

1. A direct mode operation (DMO) communication method, comprising:
   establishing, by a first terminal, a connection with a second terminal via a first DMO mode, the first DMO mode being a narrowband DMO mode or a wideband DMO mode;
   receiving, by the first terminal, a wideband DMO signal sent by the second terminal;
   determining, by the first terminal, whether the quality of the wideband DMO signal satisfies a preset switching condition; and
   if the quality of the wideband DMO signal satisfies the preset switching condition, switching, by the first terminal, the first DMO mode to a second DMO mode to communicate with the second terminal, the second DMO mode being a wideband-narrowband fused DMO dual;
   wherein the switching comprises receiving, by the first terminal, the wideband DMO signal sent by the second terminal in a target transmission slot via the wideband mode in the wideband-narrowband fused DMO dual-mode, and simultaneously sending a narrowband DMO signal to the second terminal in the target transmission slot via the narrowband mode in the wideband-narrowband fused DMO dual-mode.

2. The method according to claim 1, wherein the first DMO mode is a wideband DMO mode.

3. The method according to claim 2, wherein the determining, by the first terminal, whether the quality of the wideband DMO signal satisfies a preset switching condition comprises:
   determining, by the first terminal, whether a reference signal receiving power (RSRP) corresponding to the wideband DMO signal is lower than a first preset threshold value; and
   if the RSRP is lower than the first preset threshold value, determining, by the first terminal, that the quality of the wideband DMO signal satisfies the preset switching condition;
   or,
   determining, by the first terminal, whether a signal to interference plus noise ratio (SINR) corresponding to the wideband DMO signal is lower than a second preset threshold value; and
   if the SINR is lower than the second preset threshold value, determining, by the first terminal, that the quality of the wideband DMO signal satisfies the preset switching condition.

4. The method according to claim 1, wherein the determining, by the first terminal, whether the quality of the wideband DMO signal satisfies a preset switching condition comprises:
   determining, by the first terminal, whether a reference signal receiving power (RSRP) corresponding to the wideband DMO signal is within a first preset range; and
   if the RSRP is within the first preset range, determining, by the first terminal, that the quality of the wideband DMO signal satisfies the preset switching condition;
   or,
   determining, by the first terminal, whether a signal to interference plus noise ratio (SINR) corresponding to the wideband DMO signal is within a second preset range; and
   if the SINR is within the second preset range, determining, by the first terminal, that the quality of the wideband DMO signal satisfies the preset switching condition.

5. The method according to claim 1, wherein the narrowband DMO signal comprises feedback information, the feedback information is used for feeding back the receiving status of the wideband DMO signal sent by the second terminal received by the first terminal in a transmission slot before the target transmission slot, so that the second terminal adjusts the encoding mode of the wideband DMO signal transmitted in a transmission slot next to the target transmission slot.

6. The method according to claim 1, wherein the first DMO mode is a narrowband DMO mode.

7. The method according to claim 6, wherein the determining, by the first terminal, whether the quality of the wideband DMO signal satisfies a preset switching condition comprises:
   determining, by the first terminal, whether a reference signal receiving power (RSRP) corresponding to the wideband DMO signal is higher than a third preset threshold value; and
   if the RSRP is higher than the third preset threshold value, determining, by the first terminal, that the quality of the wideband DMO signal satisfies the preset switching condition;
   or,
   determining, by the first terminal, whether a signal to interference plus noise ratio (SINR) corresponding to the wideband DMO signal is higher than a fourth preset threshold value; and
   if the SINR is higher than the fourth preset threshold value, determining, by the first terminal, that the quality of the wideband DMO signal satisfies the preset switching condition.

8. A terminal, comprising a processor and a memory, wherein the processor executes the following modules stored in the memory:
- an establishing module, configured to establish a connection with a second terminal via a first direct mode operation (DMO) mode, the first DMO mode being a narrowband DMO mode or a wideband DMO mode;
- a receiving module, configured to receive a wideband DMO signal sent by the second terminal;
- a determination module, configured to determine whether the quality of the wideband DMO signal satisfies a preset switching condition; and
- a communication module, configured to:
  - switch the first DMO mode to a second DMO mode to communicate with the second terminal when the determination module determines that the quality of the wideband DMO signal satisfies the preset switching condition, the second DMO mode being a wideband-narrowband fused DMO dual-mode; and
  - receive the wideband DMO signal sent by the second terminal in a target transmission slot via the wideband mode in the wideband-narrowband fused DMO dual-mode, and simultaneously send a narrowband DMO signal to the second terminal in the target transmission slot via the narrowband mode in the wideband-narrowband fused DMO dual-mode.

9. The terminal according to claim 8, wherein the first DMO mode is a wideband DMO mode;
- the determination module is further configured to determine whether a reference signal receiving power (RSRP) corresponding to the wideband DMO signal is lower than a first preset threshold value; and
- the determination module is further configured to determine that the quality of the wideband DMO signal satisfies the preset switching condition when the RSRP is lower than the first preset threshold value;

or,
- the determination module is further configured to determine whether a signal to interference plus noise ratio (SINR) corresponding to the wideband DMO signal is lower than a second preset threshold value; and
- the determination module is further configured to determine that the quality of the wideband DMO signal satisfies the preset switching condition when the SINR is lower than the second preset threshold value.

10. The terminal according to claim 8, wherein:
- the determination module is further configured to determine whether a reference signal receiving power (RSRP) corresponding to the wideband DMO signal is within a first preset range; and
- the determination module is further configured to determine that the quality of the wideband DMO signal satisfies the preset switching condition when the RSRP is within the first preset range;

or,
- the determination module is further configured to determine whether a signal to interference plus noise ratio (SINR) corresponding to the wideband DMO signal is within a second preset range; and
- the determination module is further configured to determine that the quality of the wideband DMO signal satisfies the preset switching condition when the SINR is within the second preset range.

11. The terminal according to claim 8, wherein the first DMO mode is a narrowband DMO mode;
- the determination module is further configured to determine whether a reference signal receiving power (RSRP) corresponding to the wideband DMO signal is higher than a third preset threshold value; and
- the determination module is further configured to determine that the quality of the wideband DMO signal satisfies the preset switching condition when the RSRP is higher than the third preset threshold value;

or,
- the determination module is further configured to determine whether a signal to interference plus noise ratio (SINR) corresponding to the wideband DMO signal is higher than a fourth preset threshold value; and
- the determination module is further configured to determine that the quality of the wideband DMO signal satisfies the preset switching condition when the SINR is higher than the fourth preset threshold value.

12. A terminal, comprising: a radio frequency module, a processor and a memory, wherein:
- the radio frequency module executes the following step:
- receiving a wideband direct mode operation (DMO) signal sent by a second terminal; and
- the processor executes the following steps:
- establishing a connection with the second terminal via a first DMO mode, the first DMO mode being a narrowband DMO mode or a wideband DMO mode; and
- determining whether the quality of the wideband DMO signal received by the radio frequency module satisfies a preset switching condition, and if the quality of the wideband DMO signal satisfies the preset switching condition, switching the first DMO mode to a second DMO mode to communicate with the second terminal, the second DMO mode being a wideband-narrowband fused DMO dual-mode;
- wherein the radio frequency module specifically executes the following step:
  - receiving the wideband DMO signal sent by the second terminal in a target transmission slot via the wideband mode in the wideband-narrowband fused DMO dual-mode, and simultaneously sending a narrowband DMO signal to the second terminal in the target transmission slot via the narrowband mode in the wideband-narrowband fused DMO dual-mode.

13. The terminal according to claim 12, wherein the first DMO mode is a wideband DMO mode;
- the processor specifically executes the following steps:
- determining whether a reference signal receiving power (RSRP) corresponding to the wideband DMO signal is lower than a first preset threshold value; and
- determining that the quality of the wideband DMO signal satisfies the preset switching condition when the RSRP is lower than the first preset threshold value;

or,
- the processor specifically executes the following steps:
- determining whether a signal to interference plus noise ratio (SINR) corresponding to the wideband DMO signal is lower than a second preset threshold value; and
- determining that the quality of the wideband DMO signal satisfies the preset switching condition when the SINR is lower than the second preset threshold value.

14. The terminal according to claim 12, wherein:
- the processor specifically executes the following steps:
- determining whether a reference signal receiving power (RSRP) corresponding to the wideband DMO signal is within a first preset range; and
- determining that the quality of the wideband DMO signal satisfies the preset switching condition when the RSRP is within the first preset range;

or,
- determining whether a signal to interference plus noise ratio (SINR) corresponding to the wideband DMO signal is within a second preset range;

determining that the quality of the wideband DMO signal satisfies the preset switching condition when the SINR is within the second preset range.

15. The terminal according to claim 12, wherein the first DMO mode is a narrowband DMO mode;

the processor specifically executes the following steps:

determining whether a reference signal receiving power (RSRP) corresponding to the wideband DMO signal is higher than a third preset threshold value; and determining that the quality of the wideband DMO signal satisfies the preset switching condition when the RSRP is higher than the third preset threshold value;

or, determining whether a signal to interference plus noise ratio (SINR) corresponding to the wideband DMO signal is higher than a fourth preset threshold value; and determining that the quality of the wideband DMO signal satisfies the preset switching condition when the SINR is higher than the fourth preset threshold value.

16. The method according to claim 1, wherein the narrowband DMO signal comprises at least one of data or signaling.

17. The terminal according to claim 8, wherein the narrowband DMO signal comprises at least one of data or signaling.

18. The terminal according to claim 12, wherein the narrowband DMO signal comprises at least one of data or signaling.

* * * * *